(12) United States Patent
Ichihashi (10) Patent No.: US 11,415,320 B2
(45) Date of Patent: Aug. 16, 2022

(54) COMBUSTOR COOLING PANEL WITH FLOW GUIDE

(71) Applicant: United Technologies Corporation, Farmington, CT (US)

(72) Inventor: Fumitaka Ichihashi, West Hartford, CT (US)

(73) Assignee: Raytheon Technologies Corporation, Farmington, CT (US)

(*) Notice: Subject to any disclaimer, the term of this patent is extended or adjusted under 35 U.S.C. 154(b) by 82 days.

(21) Appl. No.: 16/724,980

(22) Filed: Dec. 23, 2019

(65) Prior Publication Data
US 2020/0217505 A1    Jul. 9, 2020

Related U.S. Application Data

(60) Provisional application No. 62/788,594, filed on Jan. 4, 2019.

(51) Int. Cl.
*F23R 3/00* (2006.01)
*F02C 7/18* (2006.01)
(Continued)

(52) U.S. Cl.
CPC .............. *F23R 3/002* (2013.01); *F23R 3/005* (2013.01); *F02C 7/18* (2013.01);
(Continued)

(58) Field of Classification Search
CPC ......... F05D 2240/15; F05D 2260/2214; F05D 2260/22141; F23M 5/08; F23M 5/085;
(Continued)

(56) References Cited

U.S. PATENT DOCUMENTS

| | | | |
|---|---|---|---|
| 2003/0140632 A1* | 7/2003 | Dailey | F23R 3/04 60/752 |
| 2008/0115506 A1 | 5/2008 | Patel et al. | |
| 2008/0264065 A1 | 10/2008 | Gerendas | |
| 2008/0282703 A1* | 11/2008 | Morenko | F23R 3/002 60/796 |

(Continued)

FOREIGN PATENT DOCUMENTS

| | | |
|---|---|---|
| CN | 107449308 | 12/2017 |
| WO | 2004035992 | 4/2004 |

(Continued)

OTHER PUBLICATIONS

European Patent Office, European Search Report dated Mar. 18, 2020 in Application No. 20150392.7.

(Continued)

*Primary Examiner* — Scott J Walthour
(74) *Attorney, Agent, or Firm* — Snell & Wilmer L.L.P.

(57) ABSTRACT

A panel for use with a shell as a combustor liner in a combustor section of a gas turbine engine includes a panel body having an outer surface defining a plurality of effusion holes for receiving the compressed gas to also be received in the combustion chamber of the combustor section. The panel further includes a flow guide extending from the outer surface of the panel body and configured to receive the compressed gas from an impingement hole of the shell and to direct the compressed gas over the outer surface of the panel body towards the plurality of effusion holes.

11 Claims, 6 Drawing Sheets

(51) Int. Cl.
  *F23R 3/50* (2006.01)
  *F23R 3/60* (2006.01)
(52) U.S. Cl.
  CPC .... *F05D 2220/323* (2013.01); *F05D 2240/35* (2013.01); *F05D 2260/201* (2013.01); *F05D 2260/202* (2013.01); *F23R 3/50* (2013.01); *F23R 3/60* (2013.01); *F23R 2900/03041* (2013.01); *F23R 2900/03042* (2013.01); *F23R 2900/03044* (2013.01)
(58) Field of Classification Search
  CPC .. F23R 3/002; F23R 3/005; F23R 3/04; F23R 3/06; F23R 3/50; F23R 2900/03041; F23R 2900/03042; F23R 2900/03044; F23R 2900/03045
  See application file for complete search history.

(56) References Cited

U.S. PATENT DOCUMENTS

2017/0191417 A1   7/2017  Bunker et al.
2017/0298824 A1*  10/2017 Gerendas ................. F02C 7/20

FOREIGN PATENT DOCUMENTS

WO     2014189556     11/2014
WO     2015023339     2/2015

OTHER PUBLICATIONS

European Patent Office, European Office Action dated Jun. 24, 2021 in Application No. 20150392.7.

* cited by examiner

COMBUSTOR COOLING PANEL WITH FLOW GUIDE

CROSS REFERENCE TO RELATED APPLICATIONS

This application claims the benefits of provisional application Ser. No. 62/788,594, filed Jan. 4, 2019 for Combustor Cooling Panel with Flow Guide and is incorporated by reference herein.

FIELD

The present disclosure relates generally to gas turbine engines and, more particularly, to flow guides for use with a panel of a combustor section of a gas turbine engine to provide desired flow of compressed gas over the panel.

BACKGROUND

Gas turbine engines include compressor sections to compress an airflow, combustor sections that combine the airflow with fuel for combustion and generate exhaust, and turbine sections that convert the exhaust into torque to drive the compressor sections. The combustor sections may include a combustor liner which may include an outer shell and an inner panel. The combustor liner may experience relatively great temperatures. It may be desirable to direct compressed gas across the inner panel to provide heat transfer from the panel to the compressed gas, thus cooling the panel.

SUMMARY

Described herein is a combustor panel for a gas turbine engine, the combustor panel including a first surface in communication with core engine gas flow. The combustor panel further includes a second surface, different than the first surface, for cooling the first surface. The combustor panel further includes a heat transfer augmentor extending from the second surface. The combustor panel further includes a flow guide extending from the second surface and configured to receive a cooling fluid at an acute angle and to direct the cooling fluid towards the heat transfer augmentor.

In any of the foregoing embodiments, the flow guide has a triangular cross-section with an apex configured to be oriented towards the first surface.

In any of the foregoing embodiments, the heat transfer augmentor comprises heat augmentors.

In any of the foregoing embodiments, at least some of the heat augmentors reside on the flow guide.

In any of the foregoing embodiments, the heat augmentors are separated from the flow guide.

In any of the foregoing embodiments, the flow guide is configured to direct the cooling fluid towards the heat augmentors.

In any of the foregoing embodiments, the first surface defines an impingement hole, and the apex of the flow guide is radially oriented with the impingement hole.

In any of the foregoing embodiments, the flow guide is configured to directly receive the compressed gas from multiple impingement holes defined by the first surface.

Also disclosed is a combustor panel for a gas turbine engine, the combustor panel including a shell in communication with core engine gas flow. The combustor panel further includes a panel, different than the shell, for cooling the first surface. The combustor panel further includes a heat transfer augmentor extending from the panel. The combustor panel further includes a flow guide extending from the panel and configured to receive a cooling fluid at an acute angle and to direct the cooling fluid towards the heat transfer augmentor.

In any of the foregoing embodiments, the flow guide has a triangular cross-section with an apex configured to be oriented towards the shell.

In any of the foregoing embodiments, the heat transfer augmentor includes heat augmentors.

In any of the foregoing embodiments, the heat augmentors extend from the flow guide towards the shell.

In any of the foregoing embodiments, the heat augmentors are separated from the flow guide.

In any of the foregoing embodiments, the flow guide is configured to direct the compressed gas towards the heat augmentors.

In any of the foregoing embodiments, the apex of the flow guide is radially oriented with the at least one impingement hole defined by the shell.

In any of the foregoing embodiments, the flow guide is configured to directly receive the compressed gas from multiple impingement holes defined by the shell.

Also disclosed is a combustor section for use with a gas turbine engine, the combustor section including a combustor panel defining a combustion chamber and having: a shell in communication with core engine gas flow, a panel, different than the shell, for cooling the first surface, a heat transfer augmentor extending from the panel, and a flow guide extending from the panel and configured to receive a cooling fluid at an acute angle and to direct the cooling fluid towards the heat transfer augmentor. The combustor section further includes a fuel nozzle configured to direct a fuel into the combustion chamber.

In any of the foregoing embodiments, the flow guide has a triangular cross-section with an apex configured to be oriented towards the shell.

In any of the foregoing embodiments, the heat transfer augmentor includes heat augmentors.

In any of the foregoing embodiments, the heat augmentors extend from the flow guide towards the shell.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B."

Figure 1:
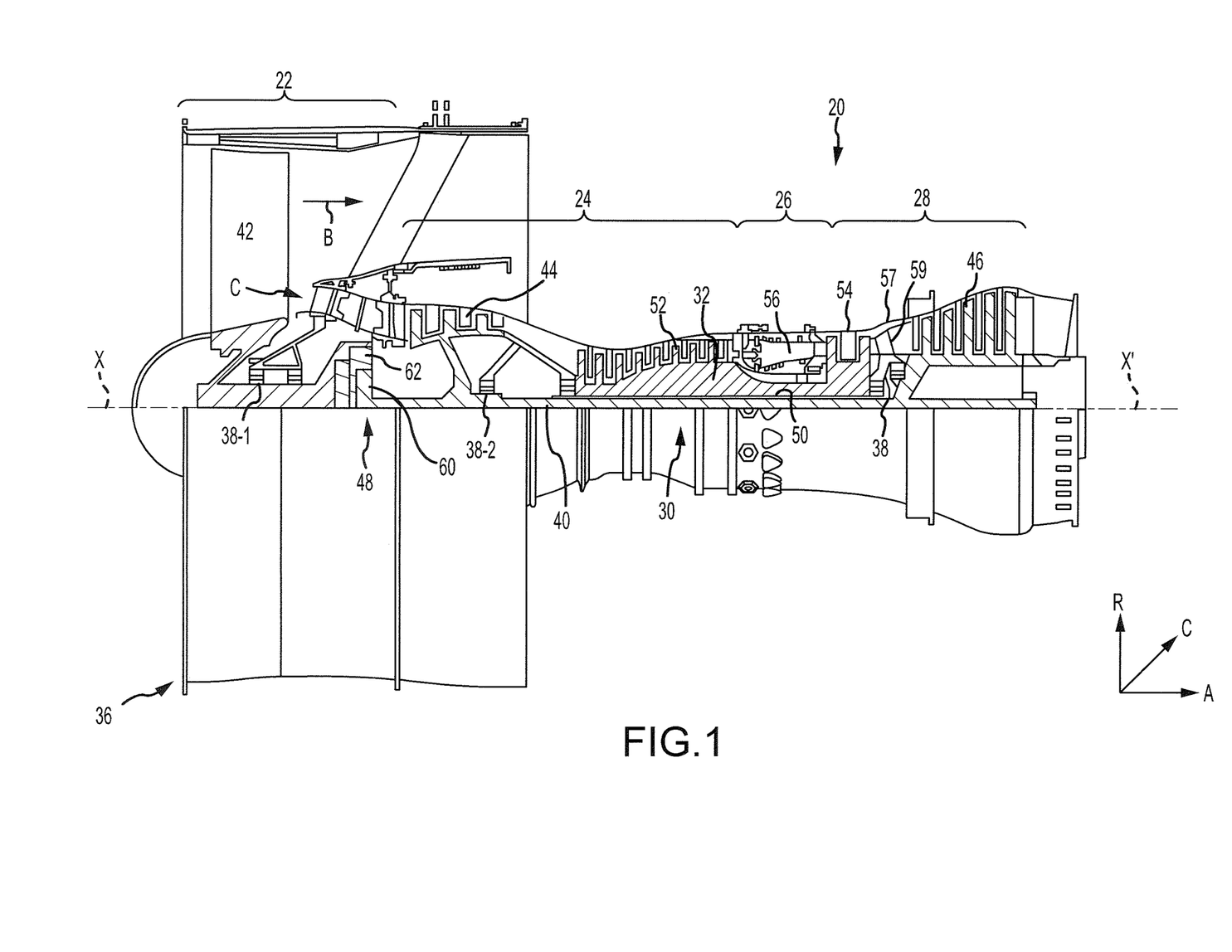
FIG. 1 is a cross-sectional view of an exemplary gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. In operation, the fan section 22 drives air along a bypass flow-path B while the compressor section 24 drives air along a core flow-path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures, geared turbofan architectures, and turboshaft or industrial gas turbines with one or more spools.

The gas turbine engine 20 generally comprises a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear diffuser case 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by the low pressure compressor section 44 then the high pressure compressor 52, mixed and burned with fuel in the combustor 56, then expanded over the high pressure turbine 54 and the low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 2:
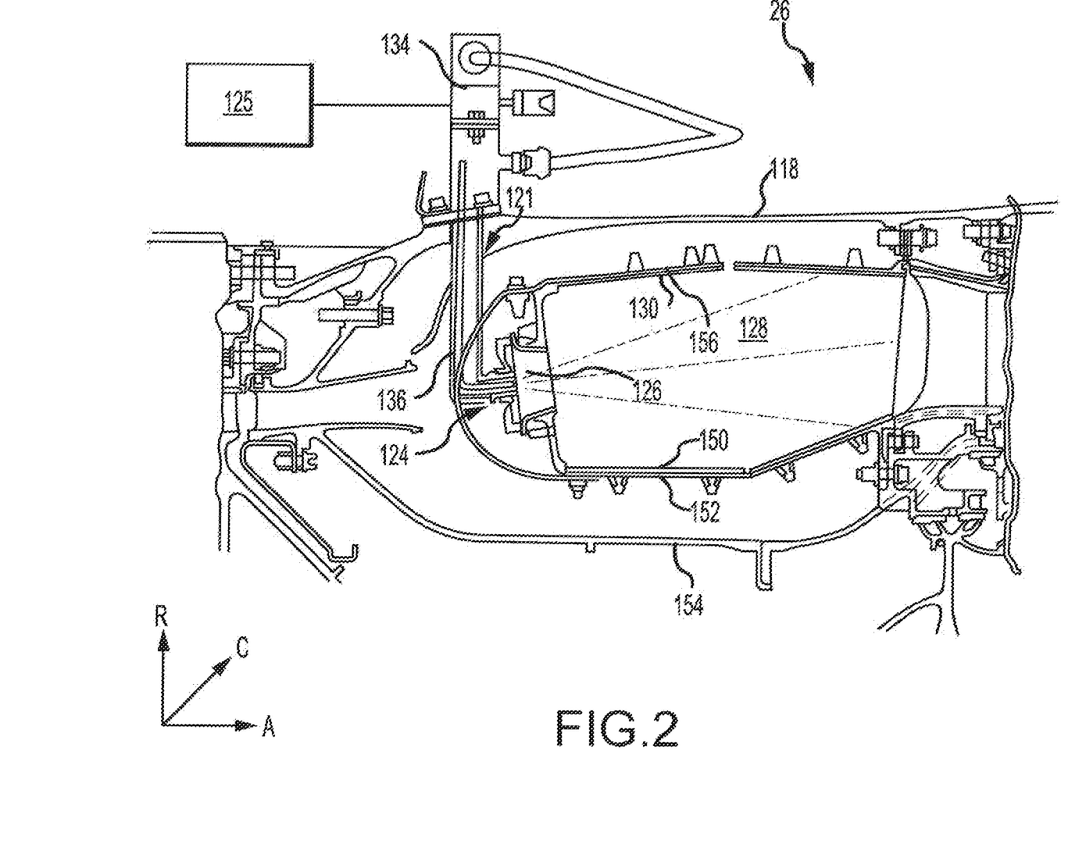
FIG. 2 is a cross-sectional view of a portion of a combustor section of the gas turbine engine of FIG. 1, in accordance with various embodiments.

In various embodiments and referring to FIG. 2, the combustor section 26 may include an annular combustor 132. The annular combustor 132 may include multiple fuel nozzles 124, which each include their own trim valve 134. In various embodiments, each fuel nozzle 124 delivers fuel to a respective section of the combustion chamber 128. The fuel nozzles 124 may be arranged circumferentially around an axis within a combustor 132. The fuel nozzles 124 may include stems 136 that extend from a diffuser case 118 to openings.

Although a single fuel nozzle 124 (and other components) is shown in the drawings, one skilled in the art will realize that the combustor section 26 may include multiple openings circumferentially around the combustor section 26 that receive fuel nozzles 124.

The combustor section 26 may further include a diffuser case 118. The diffuser case 118 surrounds or encloses a plurality of combustor liners 130. Various impingement jets may be used for impingement cooling of the liner 130, and effusion holes may be used for convection cooling and to build film cooling on the hot side of the liner.

The combustor liner 130 may define a combustion chamber 128. A fuel source 125 provides fuel to the fuel nozzle 124 for delivery to the combustion chamber 128. The fuel nozzle 124 extends through an aperture 121 in the diffuser case 118. An end of the fuel nozzle 124 may be arranged at an inlet 126 of the combustion chamber 128. One or more liners 130 (e.g. the bulkhead liners) may include an opening 127 to receive a swirler (which may itself include a hole to receive the fuel nozzle 124) to provide desired airflow motion from the compressor section 24 of FIG. 1 and to achieve a desired air/fuel mixture. These or other liners 130 can include one or more openings to receive igniters used to begin combustion of the air/fuel mixture.

The diffuser case 118 and the combustor liner 130 may define an outer shroud 156 and an inner shroud 154 therebetween. In various embodiments, air or another compressed gas may flow through at least one of the inner shroud 154 or the outer shroud 156. In various embodiments, the fuel nozzle 124 may extend through the outer shroud 156 and may be extended into the inner shroud 154. The inner shroud 154 and the outer shroud 156 may each be referred to as a diffuser chamber 154, 156.

Referring to FIGS. 2, 3A, 3B, and 3C, the combustor liner 130 may include a panel 150 and a shell 152. In various embodiments, the panel 150 may be directly or indirectly coupled to the shell 152, for example by placing the shell 152 on stand-off pins 217 on the panel 150 then securing a fastener (not shown) to the stud 209 to retain the shell 152, to resist movement of the panel 150 relative to the shell 152. The panel 150 may at least partially define the combustion chamber 128, and the shell 152 may be located between the outer shroud 156 and the panel 150, or between the inner shroud 154 and the panel. The panel 150 and shell 152 define a cavity 211 therebetween.

Figure 3A:
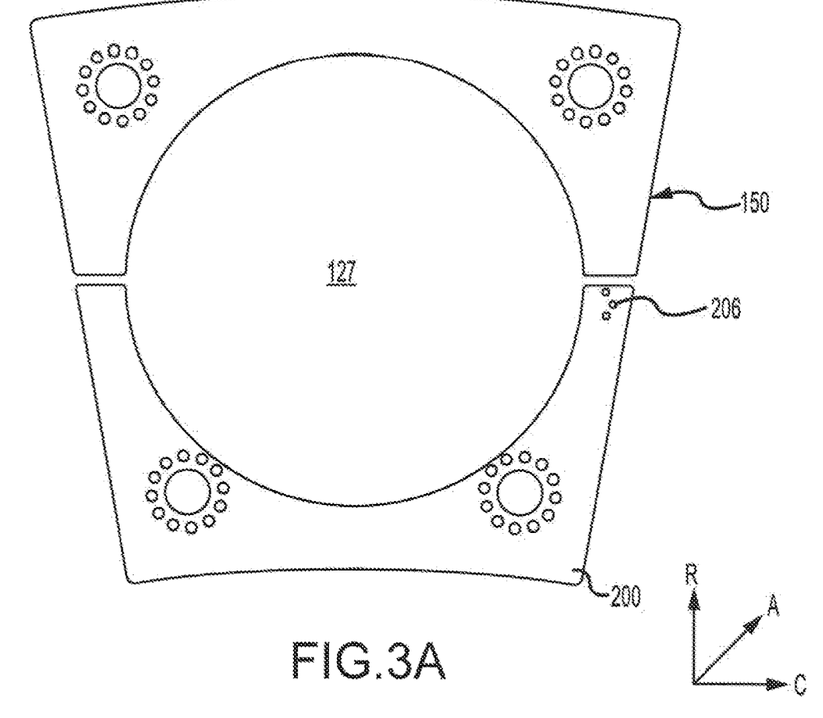
FIG. 3A illustrates a portion of a panel of a combustor liner of the combustor section of FIG. 2, in accordance with various embodiments.
Figure 3B:
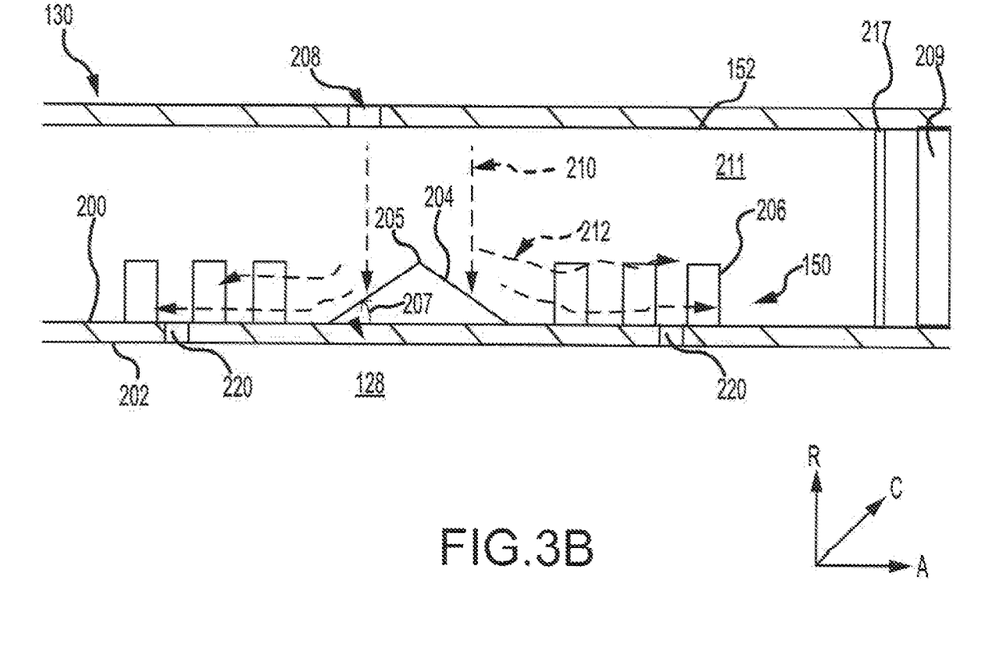
FIG. 3B illustrates a portion of the combustor liner of FIG. 3A, in accordance with various embodiments.
Figure 3C:
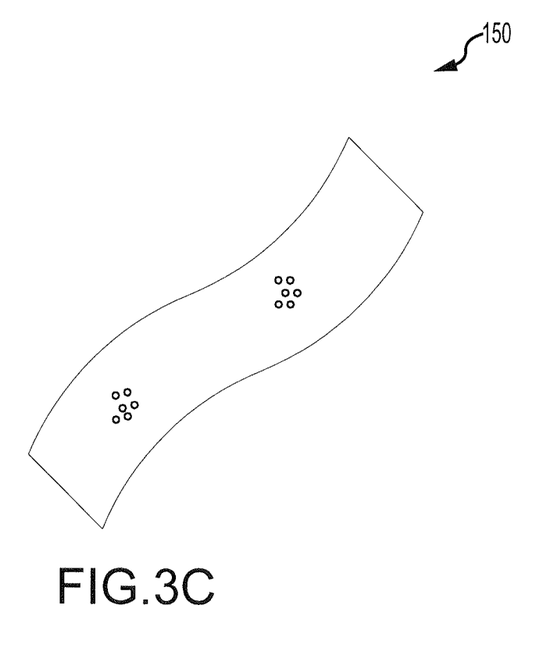
FIG. 3C illustrates another portion of a panel of a combustor liner of the combustor section of FIG. 2, in accordance with various embodiments.

The panel 150 may have an outer surface 200 (a "cold" side) that faces towards the shell 152 and an inner surface 202 (a "hot" side) that at least partially defines the combustion chamber 128. The panel 150 may further include a plurality of effusion holes 220 through which a cooling fluid, such as the core engine air (i.e. compressed gas) may flow from the cavity 211 to the combustion chamber 128.

The shell 152 may define one or more impingement holes 208 that receive a compressed gas, such as air, from the shroud 154, 156 (i.e., diffuser chamber). The compressed gas from the impingement hole 208 may be directed into the cavity 211 and towards the panel 150, as shown by arrows 210. Because the panel 150 is located proximate to the combustion chamber 128, the panel 150 may be subjected to relatively high temperatures. In that regard, cooling of the panel 150 may be desirable. The compressed gas from the impingement hole 208 may facilitate heat transfer from the panel 150 to the compressed gas, thus reducing a temperature of the panel 150. In various embodiments, the compressed gas may flow through the panel swirler (and/or through the effusion holes 220) to the combustion chamber 128 where it may mix with the fuel and be combusted.

The panel 150 may include various features to increase heat transfer from the panel 150 to the compressed gas received from the impingement holes 208 in the shell 152. In particular, the panel 150 may further include a plurality of heat augmentors 206 extending from the outer surface 200 towards the shell 152. The heat augmentors 206 may have a shape that resembles a pin and may provide increased surface area of the outer surface 200 in order to increase heat transfer from the panel 150 to the compressed gas. For example, the heat augmentors may include pin fins or material having other shapes that extends from the panel 150.

The panel 150 may further include a flow guide 204 extending from the outer surface 200 towards the shell 152. In various embodiments, the cross-section of the flow guide 204 may resemble a triangle or other shape having an apex 205 oriented towards the shell 152. For example, the flow guide 204 may resemble a cone, a dome, a triangular prism, or the like, in cross-section. The flow guide 204 may receive the compressed gas from the impingement holes 208 as shown by the arrows 210. The flow guide 204 may direct the compressed gas over a portion of the outer surface 200 as shown by arrows 212, thus directing the compressed gas in a desired direction. The flow guide 204 may increase heat transfer from the outer surface 200 and may also increase ejection of debris. The flow guide 204 could be unitary with the panel 150, or a separate piece secured to the panel 150 using known techniques.

In various embodiments, the cross-section of the flow guide 204 may resemble an isosceles triangle or an equilateral triangle, and may form an angle 207 with the outer surface 200. The angle 207 may be any angle such as, for example, between 1 degree and 89 degrees, between 10 degrees and 80 degrees, between 20 degrees and 70 degrees, or the like. The angle 207 and shape of the flow guide 204 may be selected based on a desired amount for the flow to be turned, a desired direction of the flow, or the like.

In various embodiments, some or all of the impingement holes 208 may have an angle that is equal to, greater than, or less than the angle 207 of the flow guide 204.

In various embodiments, the flow guide 204 may further turn impingement flow to enhance and drive crossflow through the heat augmentors. The flow guide 204 may be referred to as a surface area augmentation to enhance heat transfer. In various embodiments, the flow guide 204 may further host effusion holes.

Figure 4:
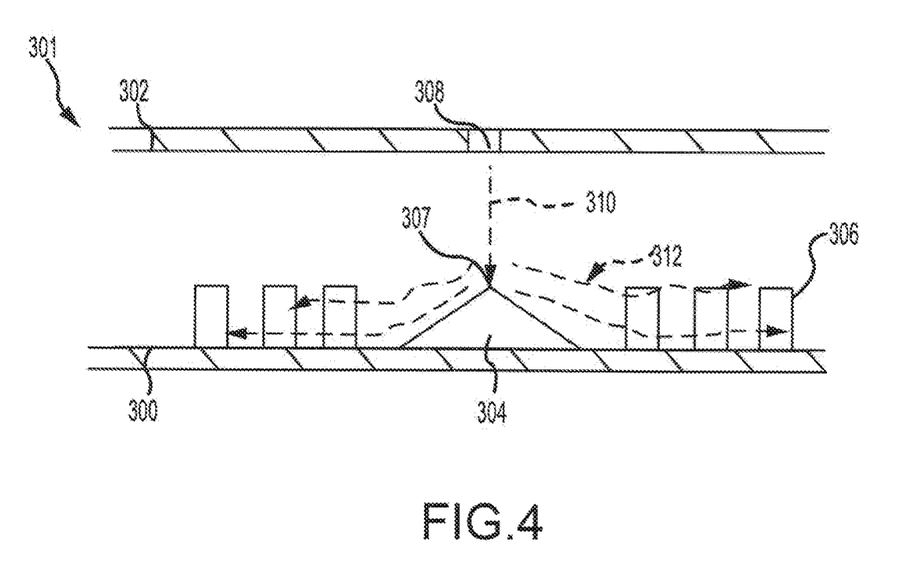
FIG. 4 illustrates a combustor liner for use in a combustor section of a gas turbine engine, in accordance with various embodiments.

As shown in FIG. 3B, the flow guide 204 may receive the compressed gas from multiple impingement holes 208. Turning to FIG. 4 and in various embodiments, another combustor liner 301 may include a flow guide 304 that receives compressed gas from a single impingement hole 308. The combustor liner 301 may include a shell 302 and a panel 300, and the panel 300 may include heat augmentors 306 extending towards the shell 302. The flow guide 304 may extend from the panel 300 towards the shell 302. The flow guide 304 may include an apex 307 directed towards the impingement hole 308. In various embodiments, the apex 307 may be directly aligned with the impingement hole 308 (such as in a radial direction) or may be offset from the impingement hole 308. In that regard, the compressed gas may be received by the flow guide 304 at the apex 307 as shown by an arrow 310. The compressed gas may then flow along an outer surface of the panel 300 towards the heat augmentors 306 as shown by arrows 312.

Figure 5:
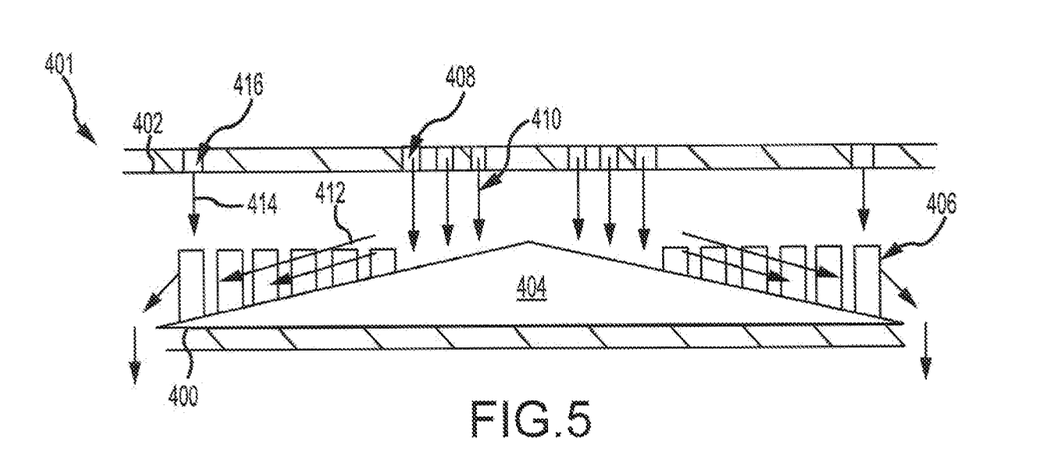
FIG. 5 illustrates a portion of a combustor liner for use in a combustor section of a gas turbine engine, in accordance with various embodiments.

In FIG. 3B, the heat augmentors 206 are separated from the flow guide 204. In some embodiments and as shown in FIG. 5, heat augmentors 406 may likewise extend towards a shell 402 from a flow guide 404 (i.e., may be aligned with the flow guide 404, such as in a radial direction). In particular, FIG. 5 illustrates a combustor liner 401 that includes a panel 400 and the shell 402. The shell 402 defines a plurality of inner impingement holes 408 and a plurality of outer impingement holes 416. The panel 400 includes the flow guide 404 and heat augmentors 406 that extend towards the shell 402.

As shown, the heat augmentors 406 extend away from the panel 400 and are in contact with the flow guide 404. The inner impingement holes 408 direct compressed gas towards the flow guide 404 at a location aligned with the flow guide 404, as shown by arrows 410. The outer impingement holes 416 direct the compressed gas towards a portion of the flow guide 404 aligned with the heat augmentors 406, as shown by arrows 414. In various embodiments, the heat augmentors 406 may have a variable height based on the location on the flow guide 404 at which they are located. In various embodiments, the heat augmentors 406 may each have the same height regardless of their location on the flow guide 404.

Figure 6:
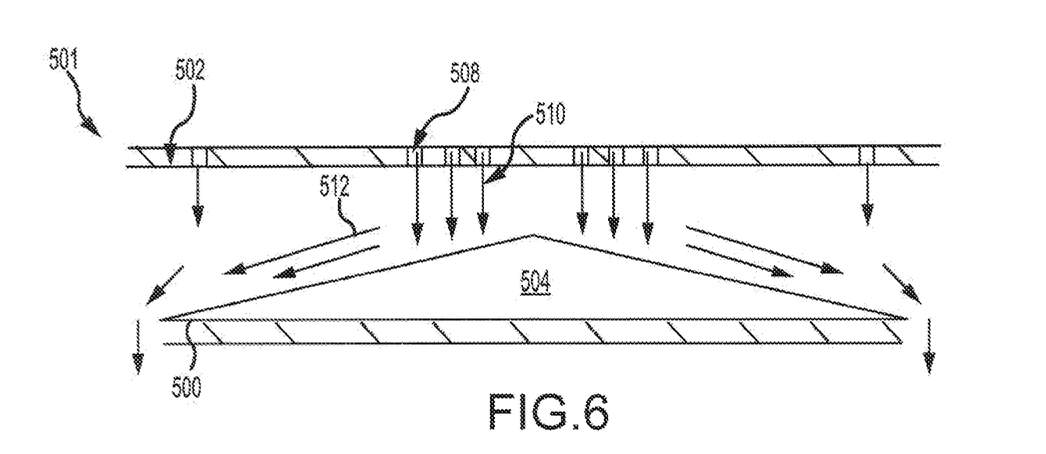
FIG. 6 illustrates a portion of a combustor liner for use in a combustor section of a gas turbine engine, in accordance with various embodiments.

Turning now to FIG. 6, another combustor liner 501 includes a panel 500 and a shell 502. The shell 502 defines a plurality of impingement holes 508 through which compressed gas may flow towards the panel 500, as shown by arrows 510. The panel 500 includes a flow guide 504 and fails to include heat augmentors. The flow guide 504 may sufficiently increase a surface area of the panel 500 to provide the desired amount of heat transfer from the panel 500 to the compressed gas. The compressed gas may flow along a surface of the flow guide 504 as shown by arrows 512.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A combustor panel for a gas turbine engine, the combustor panel comprising:
   a first surface configured to be disposed proximate a combustor and partially define a combustion chamber;
   a second surface disposed opposite the first surface, the second surface configured to partially define a cavity configured to receive a cooling fluid, the first surface and the second surface at least partially defining an opening;
   a plurality of heat transfer augmentors, each heat transfer augmentor extending from the second surface;
   a plurality of effusion cooling holes extending through from the first surface through the second surface; and
   a flow guide extending from the second surface, the flow guide disposed between a first set of heat transfer augmentors in the plurality of heat transfer augmentors and a second set of heat transfer augmentors in the plurality of heat transfer augmentors, the first set of heat transfer augmentors disposed between the flow guide and the opening, the second set of heat transfer augmentors disposed between an effusion cooling hole in the plurality of effusion cooling holes and the flow guide, the flow guide configured to receive the cooling fluid at an acute angle and to direct the cooling fluid towards the plurality of heat transfer augmentors and out the plurality of effusion cooling holes, the flow guide including a triangular cross-section with an apex oriented away from the first surface.

2. The combustor panel of claim 1, wherein at least some of the plurality of heat transfer augmentors reside on the flow guide.

3. The combustor panel of claim 1, wherein the plurality of heat transfer augmentors are separated from the flow guide.

4. A combustor liner for a gas turbine engine, the combustor liner comprising:
- a shell configured to be in communication with a core engine gas flow through a plurality of impingement holes;
- a panel disposed inward from the shell, the panel and the shell defining a cavity therebetween, the cavity configured to receive a cooling fluid, the panel at least partially defining an opening;
- a plurality of heat transfer augmentors, each heat transfer augmentor in the plurality of heat transfer augmentors extending from the panel towards the shell;
- a plurality of effusion cooling holes extending radially through the panel; and
- a flow guide extending from the panel toward the shell, the flow guide disposed between a first set of heat transfer augmentors in the plurality of heat transfer augmentors and a second set of heat transfer augmentors in the plurality of heat transfer augmentors, the first set of heat transfer augmentors disposed between the flow guide and the opening, the second set of heat transfer augmentors disposed between an effusion cooling hole in the plurality of effusion cooling holes and the flow guide, the flow guide configured to receive the cooling fluid at an acute angle and to direct the cooling fluid towards the plurality of heat transfer augmentors and out the plurality of effusion cooling holes, the flow guide including a triangular cross-section with an apex oriented away from the first surface.

5. The combustor liner of claim 4, wherein the apex of the flow guide is radially oriented with at least one impingement hole in the plurality of impingement holes defined by the shell.

6. The combustor liner of claim 4, wherein the flow guide is configured to directly receive a compressed gas from multiple impingement holes defined by the shell.

7. A combustor section for use with a gas turbine engine, the combustor section comprising:
- a combustor liner defining at least a portion of a combustion chamber and having:
  - a shell configured to be in communication with a core engine gas flow, the shell defining an impingement hole;
  - a panel spaced apart from the shell, the panel and the shell defining a cavity therebetween, the cavity configured to receive a cooling fluid, the shell and the panel at least partially defining an opening;
  - a heat transfer augmentor extending from the panel;
  - a plurality of effusion cooling holes extending radially through the panel; and
  - a flow guide extending from the panel and configured to receive the cooling fluid at an acute angle and to direct the cooling fluid towards the heat transfer augmentor, the flow guide configured to direct the cooling fluid in a first direction toward the opening, the flow guide configured to direct the cooling fluid in a second direction toward an effusion hole of the panel; and
- a fuel nozzle disposed in the opening and configured to direct a fuel into the combustion chamber.

8. The combustor section of claim 7, wherein the flow guide has a triangular cross-section with an apex oriented towards the shell.

9. The combustor section of claim 8, further comprising a plurality of the heat transfer augmentor.

10. The combustor section of claim 9, wherein each heat transfer augmentor in the plurality of heat transfer augmentors extend from the flow guide towards the shell.

11. The combustor section of claim 7, wherein:
the opening defines an opening perimeter of the panel, and
the flow guide is disposed between the effusion hole and the opening perimeter along a radial direction defined by a centerline of the opening.

\* \* \* \* \*